(12) United States Patent
Yoshikawa

(10) Patent No.: US 7,092,020 B2
(45) Date of Patent: Aug. 15, 2006

(54) RESIZING IMAGES CAPTURED BY AN ELECTRONIC STILL CAMERA

(75) Inventor: Sumito Yoshikawa, Yokohama (JP)

(73) Assignee: Eastman Kodak Company, Rochester, NY (US)

( * ) Notice: Subject to any disclaimer, the term of this patent is extended or adjusted under 35 U.S.C. 154(b) by 762 days.

(21) Appl. No.: 10/209,701

(22) Filed: Aug. 1, 2002

(65) Prior Publication Data

US 2003/0202113 A1  Oct. 30, 2003

(30) Foreign Application Priority Data

Apr. 30, 2002 (JP) .............................. 2002-128892

(51) Int. Cl.
*H04N 3/14* (2006.01)
*H04N 5/335* (2006.01)
*H04N 9/04* (2006.01)
*H04N 9/083* (2006.01)

(52) U.S. Cl. .................... 348/280; 348/240.2; 382/300

(58) Field of Classification Search ..................... None
See application file for complete search history.

(56) References Cited

U.S. PATENT DOCUMENTS

| | | | | |
|---|---|---|---|---|
| 5,335,295 A | * | 8/1994 | Ferracini et al. | 382/298 |
| 5,418,565 A | * | 5/1995 | Smith | 348/273 |
| 6,091,862 A | * | 7/2000 | Okisu | 382/300 |
| 6,710,801 B1 | * | 3/2004 | Kubo | 348/222.1 |
| 6,724,932 B1 | * | 4/2004 | Ito | 382/162 |
| 2002/0051088 A1 | * | 5/2002 | Ikeda et al. | 348/630 |
| 2003/0063201 A1 | * | 4/2003 | Hunter et al. | 348/241 |

* cited by examiner

*Primary Examiner*—Ngoc-yen Vu
*Assistant Examiner*—Hung H. Lam
(74) *Attorney, Agent, or Firm*—Pamela R. Crocker

(57) ABSTRACT

Provide an electronic still camera using a color filter array (CFA) and a single CCD making it possible to simultaneously execute the processing for color signal interpolation and the processing for resizing. In the electronic still camera according to the present invention, an R signal, a G signal, and a B signal are output from each pixel of an image sensor 12 having a CFA. A processor 16 simultaneously executes processing for interpolation and processing for resizing by computing (R, G, B) values at a given pixel position according to the color signals. Low frequency components $R_{low}$, $G_{low}$, $B_{low}$ of the color signal at the given pixel position are computed from signals from adjoining pixels, and the high frequency component $S_{high}$ is computed from a brightness value Y. The image data interpolated and changed to a desired size is stored in a memory 18, or is output via an interface I/F 20 to an external device such as a computer or a printer.

6 Claims, 7 Drawing Sheets

RESIZING IMAGES CAPTURED BY AN ELECTRONIC STILL CAMERA

FIELD OF THE INVENTION

The present invention relates to an electronic still camera and to an image processing method, and more specifically to processing for interpolation and processing for changing the size (resizing) of an image, which can be used to provide a "digital zoom" capability.

BACKGROUND OF THE INVENTION

Color filter arrays (CFA) are fabricated on a CCD array (or CMOS array) to provide color sensors used in electronic cameras (including digital cameras). With a combination of a CFA and a single CCD array, an R signal, a G signal, or a B signal are output from each pixel of the CCD array, and color image data is obtained by processing these signals. Because the signal from each pixel provides only one color, it is necessary to interpolate remaining color signals using signals from other pixels. For instance, with a Bayer type CFA, G pixels and B pixels are arrayed alternately in one line, and G pixels and R pixels are arrayed alternately in the next line. Because the R pixels above cannot generate suitable signals for G and B values required for color image data, it is necessary to interpolate the G value and B value at the R pixel position using signals from G pixels and B pixels near the R pixel. Likewise, it is necessary to interpolate R and B values at a G pixel and to interpolate R and G values at a B pixel. Further, when a color image consisting of a number of pixels significantly different than the number of pixels on the CCD array is to be output, it is necessary to resize the image data provided by the CFA interpolation processing. Generally a bi-linear interpolation or a bit-cubic interpolation is employed for resizing, which is commonly done to enlarge the center of an image from a color sensor to provide digital zoom.

SUMMARY OF THE INVENTION

In the conventional technology as described above, the processing is very complicated because it is necessary to execute CFA interpolation and resizing separately. Further, it is necessary to perform processing for changing the resolution, namely for enlarging or reducing a size of an image according to the pixel data obtained through the CFA interpolation processing, and especially when processing for enlarging an image is performed (such as for digital zoom), sharpness of the image may be lost.

The present invention was made in light of the circumstances described above, and it is an object of the present invention to provide an electronic still camera and an image processing method which simplify the required processing by making it possible to simultaneously execute the processing for CFA interpolation and the processing for resizing (e.g. enlarging the center of the image) and which can also prevent degradation of image quality.

To achieve the object described above, an electronic still camera according to the present invention has an image pickup means having a color filter array and outputting a single color signal for each pixel in a prespecified pixel array, an A/D conversion means for converting a signal from said image pickup element to a digital signal, and a processing means for generating an image having a desired size by interpolating the color signal at a given pixel position according to the color signal for each pixel.

Herein, the processing means preferably separates a low frequency component of a color signal to be interpolated from a high frequency component thereof, interpolates the low frequency component according to color signals from a plurality of pixels for the same color surrounding and adjoining a pixel position to be interpolated, and also interpolates the high frequency component according to a brightness (i.e. luminance) value at the pixel position to be interpolated as well as to those at a plurality of pixel positions surrounding and adjoining the pixel position to be interpolated.

The processing means preferably further computes an edge component of the image according to the high frequency component.

In the camera according to the present invention, the image pickup means outputs an R signal, a G signal, or a B signal for each pixel, while the processing means interpolates a low frequency component of the R signal according to signals from a plurality of R signal pixels surrounding and adjoining a pixel position to be interpolated, interpolates a low frequency component of the B signal according to signals from a plurality of B signal pixels surrounding and adjoining the pixel position to be interpolated, and further interpolates a low frequency component of the G signal according to signals from a plurality of G signal pixels surrounding and adjoining the pixel position to be interpolated.

The color filter array may be, for example, a Bayer filter array, and the processing means preferably interpolates a low frequency component of the R signal according to signals from four R signal pixels surrounding and adjoining a pixel position to be interpolated, interpolates a low frequency component of the B signal according to signals from four B signal pixels surrounding and adjoining the pixel position to the interpolated, and further interpolates a low frequency component of the G signal by generating four virtual pixels from G signal pixels surrounding and adjoining the pixel position to be interpolated and according to G signal values for the four virtual G signal pixels. Further, the processing means computes a brightness value at an intermediate pixel position among those in the prespecified pixel array, computes brightness values at four peripheral pixel positions forming a square having diagonal lines, at a cross point of which is located said pixel position to be interpolated from the brightness value at the intermediate pixel position, and further interpolates high frequency components of the R signal, G signal, and B signal according to the brightness (i.e. luminance) value at the pixel position to be interpolated and those at the peripheral pixel positions.

Further, the present invention provides a method of processing image data obtained with a color filter array and an image pickup element. This method comprises the step of generating new image data by simultaneously executing, according to a color signal for each pixel of said image pickup element, the processing for interpolating said color signal at other pixel positions and the processing for changing a size of said image.

This method preferably further comprises the step of generating new image data by simultaneously executing, according to a color signal for each pixel of said image pickup element, the processing for interpolating said color signal at other pixel positions and the processing for changing a size of said image.

As described above, with the present invention, by simultaneously executing processing for interpolation and processing for resizing (for improving the resolution), a complicated processing for resizing after interpolation is not required, and degradation of image quality can be prevented. The processing for interpolation according to the present invention can be executed by computing a color signal at a pixel position required for resizing.

DETAILED DESCRIPTION OF THE INVENTION

An embodiment of the present invention is described below with reference to the related drawings.

Figure 1:
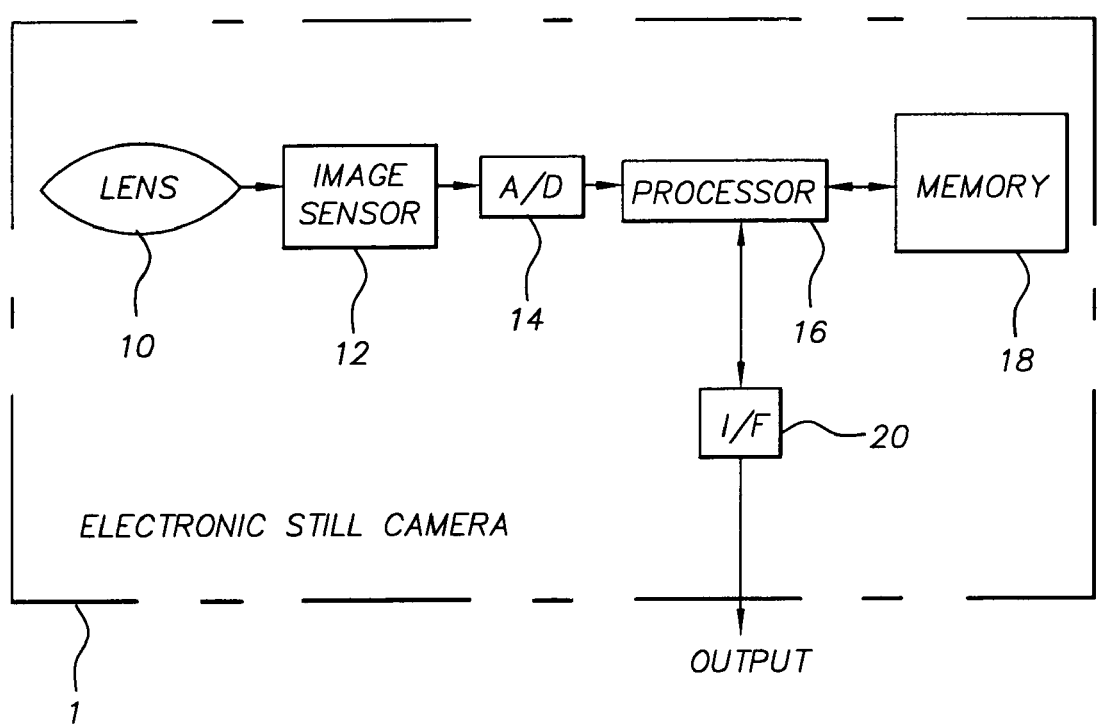
FIG. 1 is a schematic block diagram showing an electronic still camera according to an embodiment of the present invention.

FIG. 1 is a schematic block diagram showing an example electronic still camera 1 according to an embodiment of the present invention. An electronic still camera 1 comprises an optical system including a lens 10, an image sensor 12 such as a CCD array or a CMOS array, an A/D converter 14, a processor 16, a memory 18, and an interface I/F 20. The CCD array has a prespecified (i.e. known) size, such as 2.0 million pixels (i.e. 2 megapixels).

The image sensor 12 includes the Bayer type CFA, and outputs any of an R signal, a G signal, and a B signal from each pixel thereof. In the Bayer CFA, G pixels and B pixels are arrayed alternately in alternating lines in the two-dimensional array, and G pixels and R pixels are arrayed alternately in the other lines. A color signal output from each pixel of the image sensor 12 is converted to a digital signal in the A/D converter 14, and is fed to the processor 16.

The processor 16 executes a processing for interpolation and a processing for resizing each described below, and stores image data obtained through this processing in the memory 18. Further, the processor 16 reads out the image data stored in the memory 18, and outputs the read-out image data via the interface I/F 20 to an external device such as, for example, a computer system or a printer.

In an electronic still camera based on the conventional technology, when a size of an image obtained with the image sensor 12 is enlarged or reduced, the processor 16 processes the image data obtained by interpolating color signals to the processing for improving the resolution so that the resolution corresponding to the specified size can be obtained, stores the image data in the memory 18 or outputs the image data via the interface I/F 20. On the other hand, in this embodiment of the present invention, the processor 16 simultaneously executes the processing for interpolation and the processing for resizing, in other words simultaneously changes the resolution of the image during the processing for CFA interpolation, and generates image data having a desired size with a set of R, G, B values. For example, if the image sensor 12 has 2 megapixels, a first user control can be used to select an output image size of 4 megapixels, 2 megapixels or 1 megapixel. A second user control, such as a tele/wide switch, can be used to select a digital zoom ratio. For example, the second user control can be used to select zoom ratios from 1× (no zoom) to 2×, where the 2× setting enlarges the central 0.5 megapixel image area from the CCD to provide the selected output image size (e.g., 1, 2 or 4 megapixel).

Figure 2:
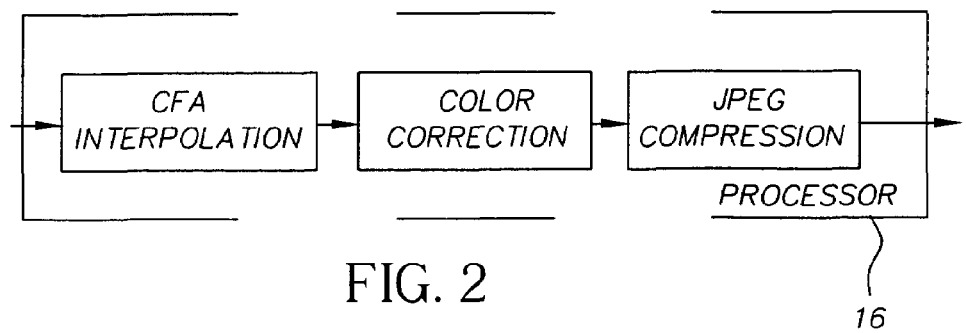
FIG. 2 is a functional block diagram showing the processing functions used in an embodiment of the present invention.

FIG. 2 is a functional block diagram showing the processing functions provided by processor 16 in FIG. 1. The processor 16 provides CFA interpolation, color correction, and JPEG compression, each represented as a functional block. The CFA interpolation generates a set of R, G, B values at a given output pixel position from the R signals, G signals, and B signals outputted from the image sensor 12. By generating color signals at the given output pixel position, the processor 16 simultaneously executes the processing for CFA interpolation and the processing for resizing (the processing for modifying the resolution). By generating an R value, a G value, and a B value at a given output pixel position (including intermediate pixel position among those in the prespecified pixel array of the image sensor 12) the processing for CFA interpolation is executed to generate image data with a desired resolution. For example, to improve the resolution to a two times higher level (e.g. to provide a 4 megapixel output image from a 2 megapixel CCD), it is only necessary to generate one other set of R, G, B values at an intermediate pixel position in the original CFA pixel array and add the set to the original set of R, G, B values. The image data having been subjected to CFA interpolation and resizing is provided to the color correction section, where color correction of parameters such as white balance is performed and the image data is then compressed in the JPEG compression section.

Figure 3:
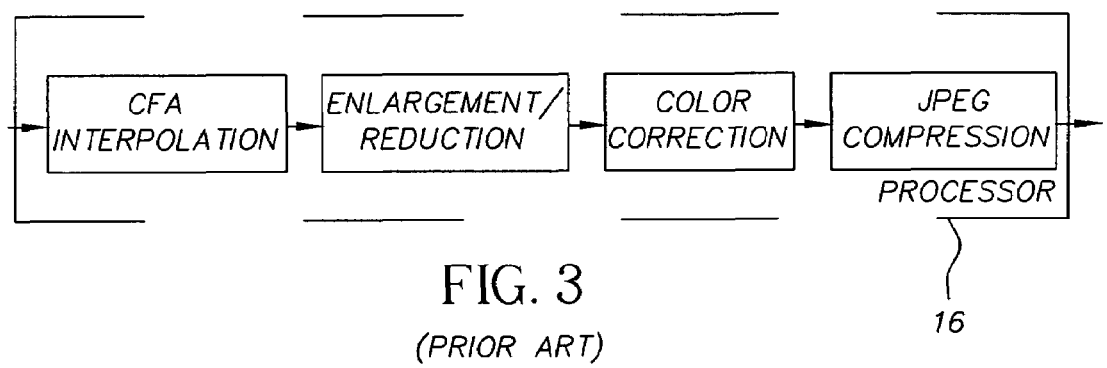
FIG. 3 is a functional diagram showing prior art processing functions.

FIG. 3 is a functional block diagram showing the functions performed by processor 16 in the electronic still camera 1 based on the prior art approach, as a comparative example. As described above, in an electronic still camera using the conventional approach, the processing for enlarging or reducing a size of an image is performed after CFA interpolation, and the processor 16 first performs the CFA interpolation processing and then performs enlargement/reduction processing as shown in FIG. 3. Superiority of the present invention over the prior art can readily be understood by comparing FIGS. 2 and 3.

First, in this embodiment, a color signal is divided to a low frequency component and a high frequency component. In a preferred embodiment, the processing can be expressed by the following equations:

$$R = R_{low} + S_{high}$$

$$G = G_{low} + S_{high}$$

$$B = B_{low} + S_{high} \qquad (1)$$

Of the signal components above, the low frequency components $R_{low}$, $G_{low}$, and $B_{low}$ are computed by linearly interpolating color signals from a plurality of pixels adjoining the pixel position to be interpolated.

On the other hand, the high frequency component $S_{high}$ is divided to a sharpness component $S_{sharp}$ and a noise smoothing element $S_{smooth}$. In a preferred embodiment, the following equation is used:

$$S_{high} = K_{sharp} \times S_{sharp} - K_{smooth} \times S_{smooth} \quad (2)$$

Here, $S_{sharp}$ and $S_{smooth}$ are calculated according to a virtual brightness (i.e. luminance) signal Y computed from a color signal from the image sensor 12. $K_{sharp}$ and $K_{smooth}$ are parameters used for controlling amplitudes of $S_{sharp}$ and $S_{smooth}$, and are derived from a secondary differential value Diff of the brightness value Y signal.

$$i \ Diff = |S_{sharp}| + |S_{smooth}|$$

$$K_{sharp} = (Diff/Thr) \times K$$

$$K_{smooth} = K - K_{sharp} \quad (3)$$

Figure 4:
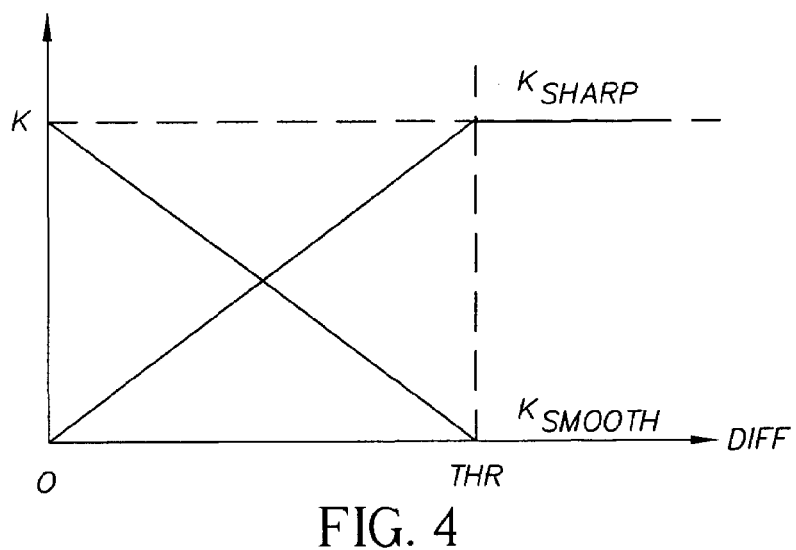
FIG. 4 is graph showing the relation between $K_{sharp}$ and $K_{smooth}$.

FIG. 4 shows the relation between $K_{sharp}$ and $K_{smooth}$. K and Thr are parameters which are set to respective prespecified values, and, when the value Diff is not more than the threshold value Thr, $K_{sharp}$ and $K_{smooth}$ are complementary to each other, and as the differential value Diff increases (the image changes rapidly), $K_{smooth}$ decreases while $K_{sharp}$ increases. When the value Diff is greater than the threshold value Thr, $K_{sharp}$ increases to the maximum value K and $K_{smooth}$ is reduced to zero.

The processor 16 executes the processing for CFA interpolation (CFA interpolation accompanying the process for resizing) by computing a low frequency component and a high frequency component at a given pixel position to compute a set of R, G, B values.

Figure 5:
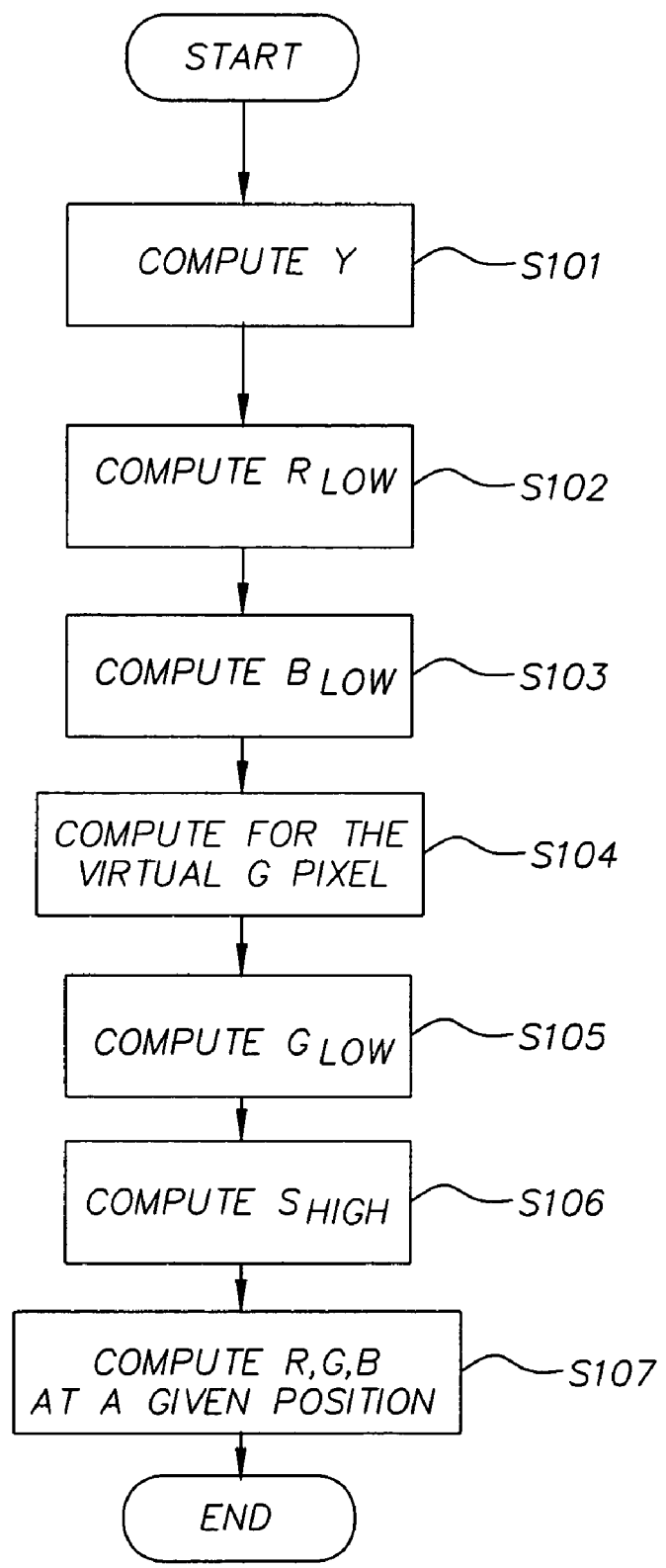
FIG. 5 is a flowchart showing the general processing flow in an embodiment of this invention.

FIG. 5 is a flowchart showing the general sequence of the processing executed by the processor 16. First, the processor 16 computes a brightness value Y according to color signals outputted from pixels of the image sensor 12 (S101). More specifically, the processor 16 computes a brightness value Y at an intermediate pixel position among the original CFA pixel positions according to signals from the adjoining R, G, and B pixels. Then the processor 16 computes a low frequency component $R_{low}$ for R at a pixel position to be interpolated (S102), and further computes a low frequency component $B_{low}$ for B at the pixel position to be interpolated (S103). Computation for $R_{low}$ and $B_{low}$ is performed using an R value for an R pixel and a B value for a B pixel surrounding and adjoining the pixel position to be interpolated. The pixel position to be interpolated is decided according to the size desired for an image to be generated.

After the respective low frequency components $R_{low}$, $B_{low}$ for R and B are calculated, a low frequency component $G_{low}$ for G is calculated. The low frequency component $G_{low}$ for G is calculated by first computing a virtual G pixel and then using this virtual G pixel (S104, S105). The virtual G pixel is calculated because the G pixels are arrayed linearly (on a diagonal line) in a Bayer CFA.

After the low frequency components $R_{low}$, $G_{low}$, and $B_{low}$ at the position to be interpolated, and high frequency components $S_{high}$ for each color are calculated (S106), finally the R, G, B values at the pixel position to be interpolated are determined (S107).

Each processing step is described in more detail below.

Computing the Brightness Value Y (S101)

Figure 6:
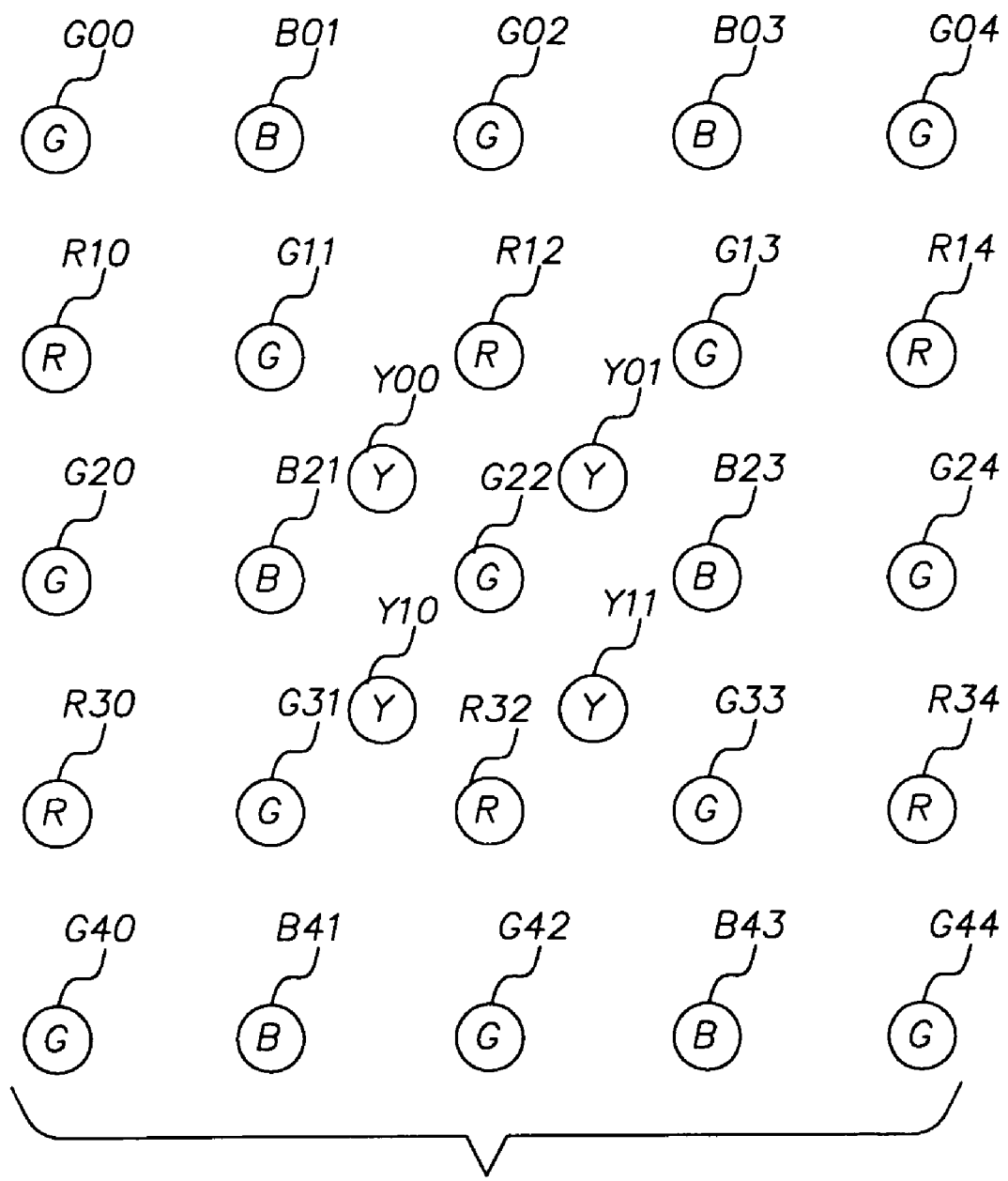
FIG. 6 is an explanatory view showing the processing for computing a brightness value Y.

FIG. 6 shows the processing for computing the brightness value Y in step S101. In this figure, R indicates an R pixel, G indicates a G pixel, and B indicates a B pixel. In the Bayer CFA, G pixels and B pixels are arrayed alternately, such as for example, G00, B01, G02, B03, G04, in a line as shown in the figure. G pixels are arrayed linearly along diagonal lines. A brightness value Y for a central pixel position among the CFA pixels is computed. In FIG. 6, Y00 is shown as a central position among G11, R12, B21, G22; Y01 is shown as a central position among R12, G13, G22, B23; Y10 is shown as a central position among B21, G22, G31, R32; and Y11 is shown as a central position among G22, B23, R32, and G33. The brightness value Y at Y00 is computed from a total of 10 adjoining pixels, namely G11, G22, R12, B21, R10, B01, R32, B23, R30, and B03. More specifically, Y00 is computed through the following formula:

$$Y00 = \text{ratio } G \times (G11+G22)/2 + \text{ratio } C \times \{9 \times (R12+B21) + 3 \times (R10+B01) + d(R32+B23) + (R30+B03)\}/32 \quad (4)$$

It should be noted that the R component and B component in the second term is the right side are found as described below. When a value of A positioned at Y00 is RY00, the following equation will hold true:

$$RY00 = 3/4 \times (3/4 \times R12 + 1/4 \times R10) + 1/4 \times (3/4 X R\ 32 + 1/4 \times R30) = (9 \times R12 + 3 \times R12 + 3 \times R32 + 1 \times R30)/16$$

Similarly, when a value of B positioned at Y00 is BY00, the following equation will hold true:

$$BY00 = (9 \times B21 + 3 \times B23 + 3 \times B01 + 1 \times B03)$$

The equation above can therefore be obtained from the equation: $Y00 = \text{ratio } G \times (G11+G22) + \text{ratio } C \times (RY00+BY00)/2$ Here, the ratio G and ratio C indicates a weight of the G signal and weights of the R signal and B signal each at position Y00 respectively, and known weights of the color signals for the brightness are used. The G component in the first term in the right side is an intermediate value between pixels G11 and G22 adjoining each other, and the R component and B component in the second term in the right side are calculated by bi-linear interpolation.

Similarly Y01, Y10, and Y11 are calculated through the following equation:

$$Y01 = \text{ratio } G \times (G13+G22)/2 + \text{ratio } C \times \{9 \times (R12+B23) + 3 \times (R14B+03) + 3 \times (R32+B219 + (R34\ B01))\}/32 \quad (5)$$

$$Y10 = \text{ratio } G \times (G22+G31)/2 + \text{ratio } C \times \{9 \times (R32+B21) + 3 \times (R12+B23) + 3 \times R30+R41) + (R10+B43)\}/32 \quad (6)$$

$$Y11 = \text{ratio } G \times (G22+G33)/2 + \text{ratio } C \times \{9 \times (R32+B23) + 3 \times (R12+B21) + 3 \times (R34+B43) + (R14+B41)\}/32 \quad (7)$$

Through the equations described above, the brightness value Y at a central pixel position among those in the CFA is computed. This brightness value Y is used for computing the high frequency component $S_{high}$ at a given pixel position. More specifically, the brightness value Y is used for computing $S_{sharp}$ and $S_{smooth}$ of the high frequency component $S_{high}$.

<Computing a Low Frequency Component of R and a Low Frequency Component of B (Steps S102 and S103)>

Figure 7:
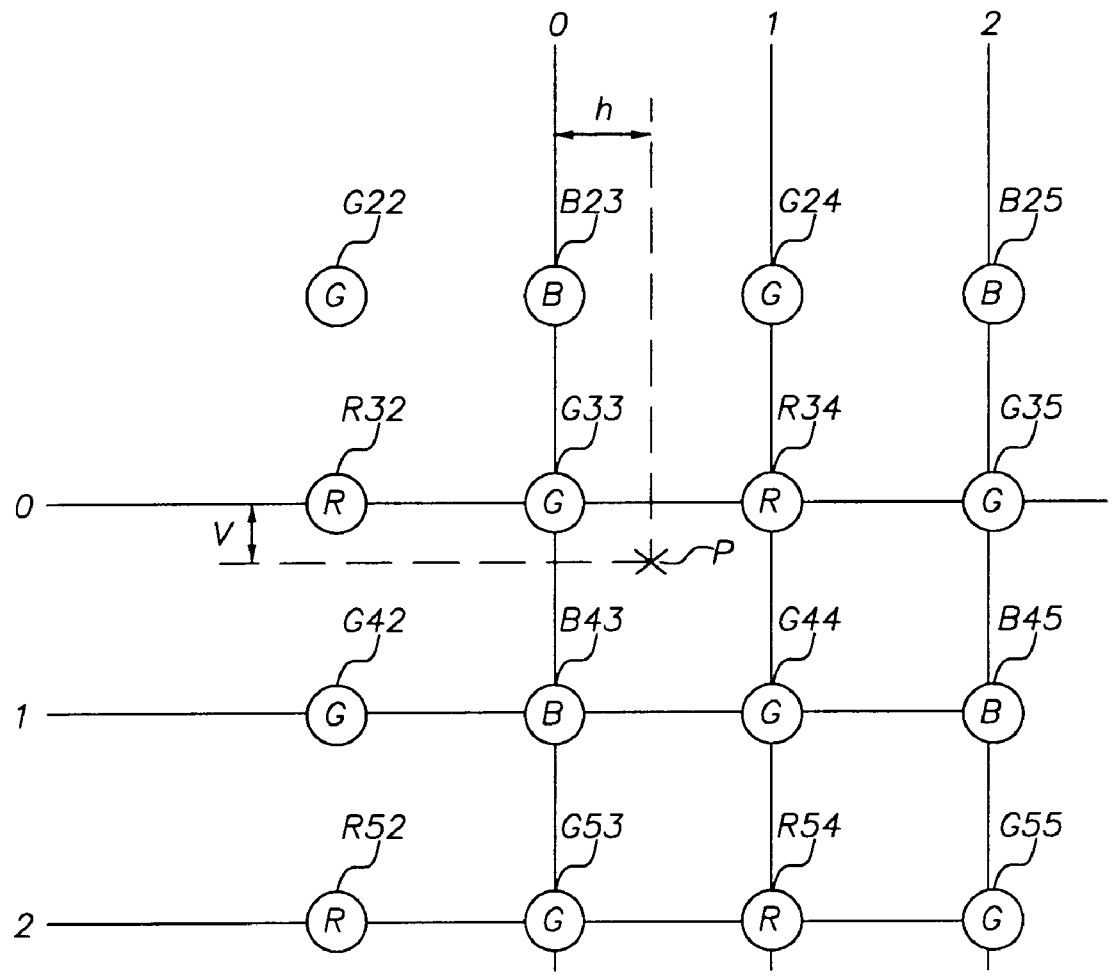
FIG. 7 is a explanatory view showing the processing for computing $R_{low}$ and $B_{low}$.

FIG. 7 shows the steps S102 and S103 of computing $R_{low}$ and $B_{low}$. It is assumed herein that the $R_{low}$ and $B_{low}$ of the pixel X at the position P is computed. It is also assumed that the pixel X is separated from the reference position by a distance h in the horizontal direction and by a distance v in the vertical direction. $R_{low}$ at the pixel X is then computed from R32, R34, R52, R54 which are four pixels for the same color adjoining the pixel X. In this case, the following equation can be used:

$$R_{low} = [(2-v)\times\{(1+h)\times R34 + (1-h)xR32\} + v \times\{(1+h)\times \\ R54 + (1-h)\times R52\}]]/4 = \{(2-v)\times(1+h)\times R34 + (2-v)\times \\ (1-h)\times R32 + V\times(1+h)\times R54 + v\times(1-h)\times R52\}\}/4 \quad (8)$$

On the other hand, $B_{low}$ is computed from B23, B25, B43, B45 which are pixels for the same color adjoining the pixel X.

In this case, the following equation can be used:

$$B_{low} = [(1+v)\times\{(2-h)\times B43 + h\times B45) + (1-v)\times\{(2-h)\times \\ B23 + h\times B25\}]/4 = \{1+v)\times(2-h)\times B43 + (1+v)\times h\times \\ B45 + (1-v)\times(2-h)\times B23 + (1-v)\times h\times B25\}/4 \quad (9)$$

<Computing a Low Frequency Component of G (S104 and S105)>

<Computing a Virtual G Pixel (S104)>

Figure 8:
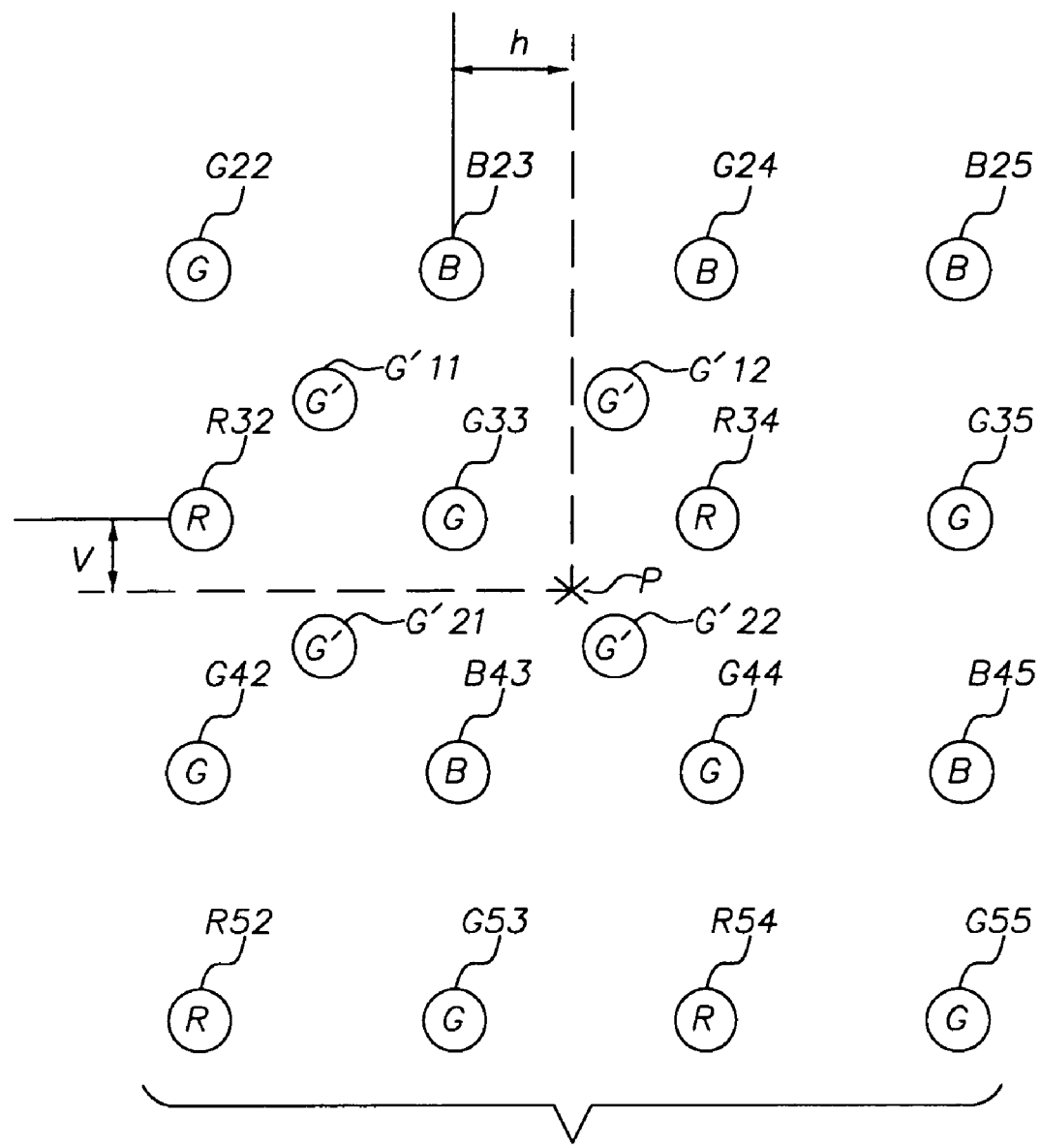
FIG. 8 is an explanatory view showing the processing for computing $G_{low}$.

FIG. 8 illustrates the computations at step S104 related to the virtual G pixel. As described above, the $G_{low}$ of the pixel X at the position P is computed from the virtual G pixel. The virtual G pixel G' is at the central position among the CFA pixels as shown in FIG. 8, and four virtual G' pixels surround the pixel X. The G'11 is at a central position among G22, R23, R32, G33; G'12 is at a central position among R23, G24, G33, R34; G'21 is at a central position among R32, G33, G42, B43; and G'22 is at a central position among G33, R34, B43, G44. These virtual G pixels are calculated by linear approximation using the equations below:

$$G'11=(G22+G33)/2 \quad (10)$$

$$G'12=(G24+G33)/2 \quad (11)$$

$$G'21=(G33+G42)/2 \quad (12)$$

$$G'22=(G33+G44)/2 \quad (13)$$

<Computing $G_{low}$ Using the Virtual G Pixels (S105)>

After the virtual G pixels G' are found as described above, the low frequency component $G_{low}$ of G at the pixel X is found using the values for the four virtual pixels G'. The following equation is used:

$$G_{low}=\{(1/2-v)\times(1/2-h)\times G'11+(1/2-v)\times(1/2+h)\times G'12+ \\ (1/2+v)\times(1/2-h)\times G'21+(1/2+v)\times(1/2+h)\times \\ G'22\}\}/4 \quad (14)$$

<Computing the High Frequency Component $S_{high}$ (S106)>

Figure 9:
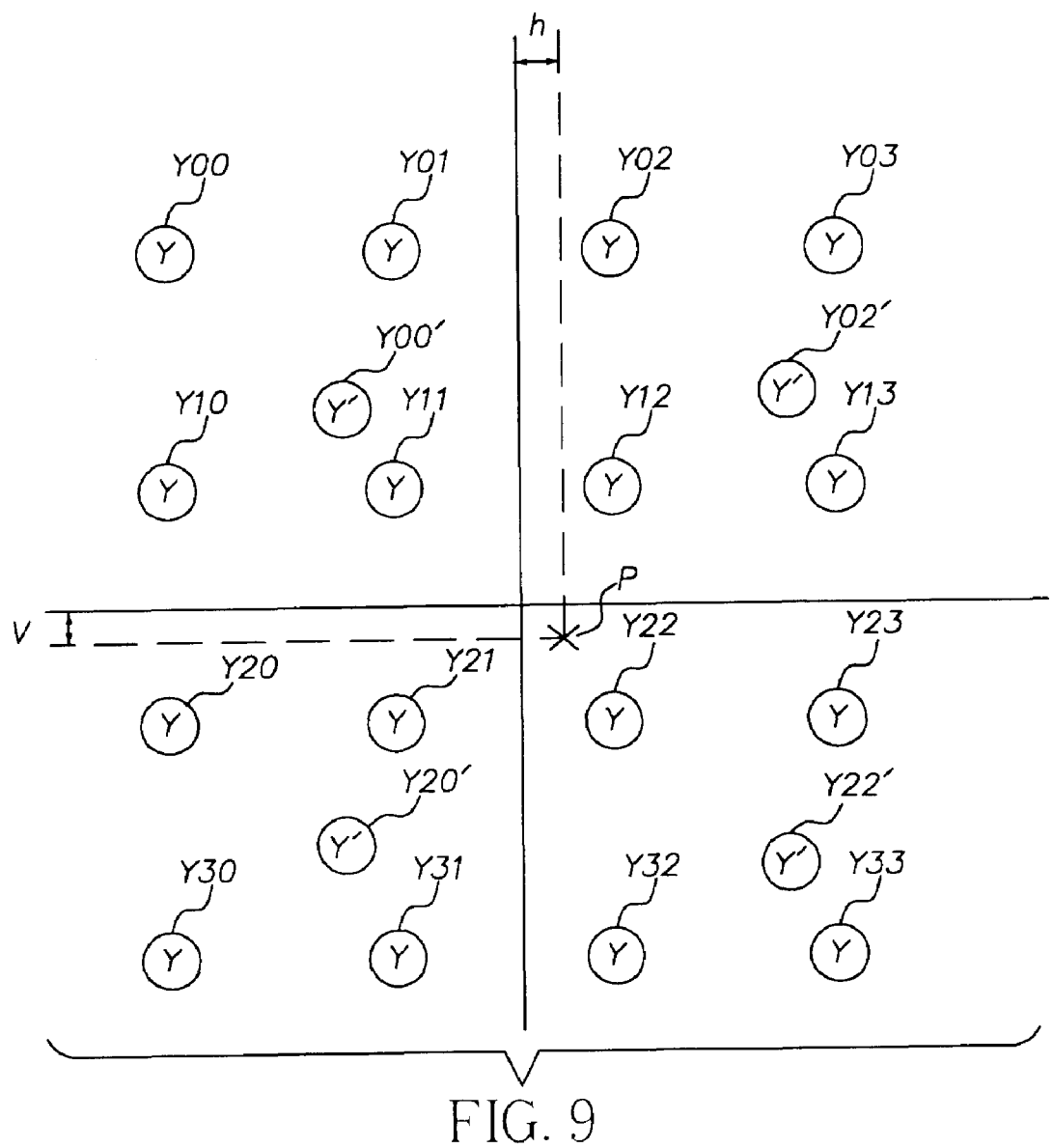
FIG. 9 is an explanatory view showing the processing for computing $S_{high}$.

FIG. 9 shows the processing for computing a high frequency component $S_{high}$ of a color signal in the step S106. The $S_{high}$ component at the pixel X is calculated according to brightness (i.e. luminance) values Y at four pixel positions forming a square, at a cross point of diagonal lines which is positioned at the pixel X. FIG. 9 shows the pixels each as T', and the pixel X is positioned at a cross point between the two diagonal lines among pixel positions Y'00, Y'02, Y'21, and Y'22. Y'00, Y'02, Y'21, and Y'22 are calculated from the brightness values found at step S101, namely from brightness values at a position central to four CFA pixel positions.

More specifically, Y'00 is computed from a brightness value at a position central to Y00, Y01, Y10, Y11; Y'02 is computed from a brightness value at a position central to Y02, Y03, Y12, Y13; Y'20 is computed from a brightness value at a position central to Y20, Y21, Y30, Y31; and Y'22 is computed from a brightness value at a position central to Y22, Y23, Y32, Y33. These operations can be performed using the following equations, respectively:

$$Y'00=\{(1/2-V)\times Y00+(1/2-h)\times(1/2+v)\times(1/2+h)\times Y01+ \\ (1/2+v)\times(1/2-h)\times Y10+(1/2+v)\times(1/2+h)\times Y11\}/2 \quad (15)$$

$$Y'02\{(1/2-v)\times(1/2-h)\times Y02+(1/2+v)\times(1/2+h)\times Y03 \\ +(1/2+v)\times(1/2-h)\times Y12+(1/2+v)\times(1/2+h)\times Y13\}/2 \quad (16)$$

$$Y'20=\{(1/2-v)\times(1/2-h)\times Y20+(1/2-v)\times(1/2+h)\times Y21+ \\ (1/2+v)\times(1/2-h)\times Y30+(1/2-v)\times(1/2+h)\times Y31\}\}/2 \quad (17)$$

$$Y'22=\{(1/2-v)\times(1/2-h)\times Y22(1/2-v)\times(1/2+h)\times Y23+(1/ \\ 2+v)\times(1/2-h)\times Y32(1/2+v)\times(1/2+h)\times Y33\}\}/2 \quad (18)$$

$S_{sharp}$ and $S_{smooth}$, representing the high frequency component $S_{high}$ at the pixel X, are calculated from a brightness value Yx at the pixel X and from the brightness values Y' at pixels adjoining the pixel X using the following equations:

$$S_{sharp}=2\times Yx\ Y'00-Y'22 \quad (19)$$

$$S_{smooth}=2\times Yx-Y'02-Y'20 \quad (20)$$

The brightness Yx at the pixel X is calculated from the brightness values at the pixels Y11, Y12, Y21, Y22 surrounding and adjoining the pixel X using the following equation:

$$Yx=\{(1/2-v)\times(1/2-h)\times Y11+(1/2-v)\times(1/2+h)\times Y12+(1/ \\ 2+v)\times(1/2-h)\times Y21+(1/2+v)\times(1/2+h)\times Y22\}/2 \quad (21)$$

The low frequency component and the high frequency component of the pixel X at the position P are calculated, and the R, G, B values at the pixel X, Rx, Gx, Bx, are obtained using the following equations:

$$Rx=R_{low}+S_{high}$$

$$Gx=G_{low}+S_{high}$$

$$Bx=B_{low}+S_{high-} \quad (22)$$

The processing in the preferred embodiment described above, calculates $S_{sharp}$ and $S_{smooth}$ in computing the high frequency component $S_{high}$ of a color signal. These values can be used to emphasize (i.e., sharpen) edges in the image. The processing for emphasizing edges in the image is described below.

<Emphasis of an Image Edge>

The signal S' produced by the edge emphasis processing can be expressed by the following equation in the unsharp masking method:

$$S'=S+w\times(S-S.f) \quad (23)$$

Here, S is the original signal, while S.f represents a signal which has passed through a low-pass filter and w indicates a relative weight. The signal S' produced by the edge emphasis processing can be obtained by adding a signal, obtained by subtracting the signal smoothed in the low-pass filter from the original signals, to the original signal S with a specific weight. In this embodiment, the signal S is divided to a low frequency component $S_{low}$ and a high frequency component $S_{high}$, wherein the high frequency component $S_{high}$ comprises $S_{sharp}$ and $S_{smooth}$. Therefore, the following equation can be used for edge enhancement:

$$S=S_{low}+S_{high}=S_{low}+K_{sharp}\times S_{sharp}-K_{smooth}\times S_{smooth}. \quad (24)$$

Assuming that the low-pass filter f is for $S_{smooth}$, the signal S" passing through the low-pass filter can be obtained from the equation:

$$S''=S_{low}-K \times S_{smooth}. \quad (25)$$

Therefore the signal S' having been subjected to the processing for edge emphasis can be expressed by the equation:

$$\begin{aligned} S' &= S + w \times (S - S'') \quad (26) \\ &= S + W \times (K_{sharp} \times S_{sharp} - K_{smooth} \times S_{smooth} + K \times S_{smooth}) \\ &= S + w \times K_{sharp} \times (S_{sharp} + S_{smooth}) \end{aligned}$$

It should be noted that the relation $K_{smooth}=K-K_{sharp}$ is used in the equation above.

Because $S_{sharp}$ and $S_{smooth}$ are obtained during the processing for computing $S_{high}$, the edge emphasis signal S' can also be computed using these signals. Thus, in some embodiments of this invention, the processing for CFA interpolation and the processing for resizing can be executed simultaneously, and the processing for edge emphasis can also be performed simultaneously.

As described above, with the present invention, by simultaneously executing the processing for CFA interpolation and the processing for resizing, it is possible to simplify the processing sequence by simultaneously executing the processing for CFA interpolation and the processing for resizing. Degradation of image quality is also thereby minimized.

PARTS LIST 1 still camera
10 lens
12 image sensor
14 A/D converter
16 processor
18 memory
20 interface

What is claimed is:

1. An electronic still camera comprising:
   (a) an image sensor having a color filter array and capable of outputting a color signal for each pixel in a prespecified pixel array;
   (b) an A/D conversion means for converting a signal from said image sensor to a digital signal; and
   (c) a processor for generating an image having a desired size by interpolating the color signal at a given pixel position according to the color signal for each pixel to produce an output image size different from said prespecified pixel array size; wherein said processor separates a low frequency component of the color signal to be interpolated from a high frequency component thereof, interpolates said low frequency component using signals from a plurality of same color pixels surrounding and adjoining the pixel position to be interpolated, and interpolates said high frequency component using a brightness value at a pixel position to be interpolated as well as brightness values at a plurality of pixel positions surrounding and adjoining the pixel position to be interpolated.

2. The electronic still camera according to claim 1, wherein said processor further computes an edge component of said image using said high frequency component.

3. The electronic still camera according to claim 1, wherein said image sensor outputs a R signal, a G signal, and a B signal for each pixel, while said processor:
   interpolates the low frequency component of said R signal using signals from R signal pixels surrounding and adjoining the pixel position to be interpolated;
   interpolates the low frequency component of said B signal using signals from B signal pixels surrounding and adjoining the pixel position to be interpolated; and
   interpolates the low frequency component of said G signal using signals from G signal pixels surrounding and adjoining the pixel position to be interpolated.

4. The electronic still camera according to claim 3, wherein said color filter array is a Bayer filter array, and said processor:
   interpolates the low frequency component of said R signal using signals from four R signal pixels surrounding and adjoining the pixel position to be interpolated;
   interpolates the low frequency component of said B signal using four B signal pixels surrounding and adjoining the pixel position to be interpolated; and
   interpolates the low frequency component of said G signal by generating four virtual G signal pixels from G signal pixels surrounding and adjoining the pixel position to be interpolated and using G signal values for said four virtual G signal pixels.

5. The electronic still camera according to claim 4, wherein said processor:
   computes a brightness value at an intermediate pixel position among those in said prespecified pixel array;
   computes brightness values at four peripheral pixel positions forming a square having diagonal lines, at a cross point of which is located said pixel position to be interpolated from the brightness value at the intermediate position; and
   interpolates high frequency components of said R signal, G signal, and B signal using the brightness value at the pixel position to be interpolated and those at said peripheral pixel positions.

6. A method of processing image data obtained with an image sensor having a color filter array and capable of outputting a color signal for each pixel in a prespecified pixel array, the method comprising the step of:
   converting a color signal from said image sensor to a digital signal; and
   generating an image having a desired size by interpolating the color signal at a given pixel position according to the color signal for each pixel to produce an output image size different from said prespecified pixel array size, wherein the color signal at a given pixel position is interpolated by separating a low frequency component of the color signal to be interpolated from a high frequency component thereof, interpolating said low frequency component using signals from a plurality of same color pixels surrounding and adjoining the pixel position to be interpolated; and interpolating said high frequency component using a brightness value at a pixel position to be interpolated and brightness values at a plurality of pixel positions surrounding and adjoining the pixel position to be interpolated.

* * * * *